Jan. 9, 1951 R. J. URICK ET AL 2,537,105
OSCILLOSCOPE AND ITS CIRCUIT
Filed April 1, 1946
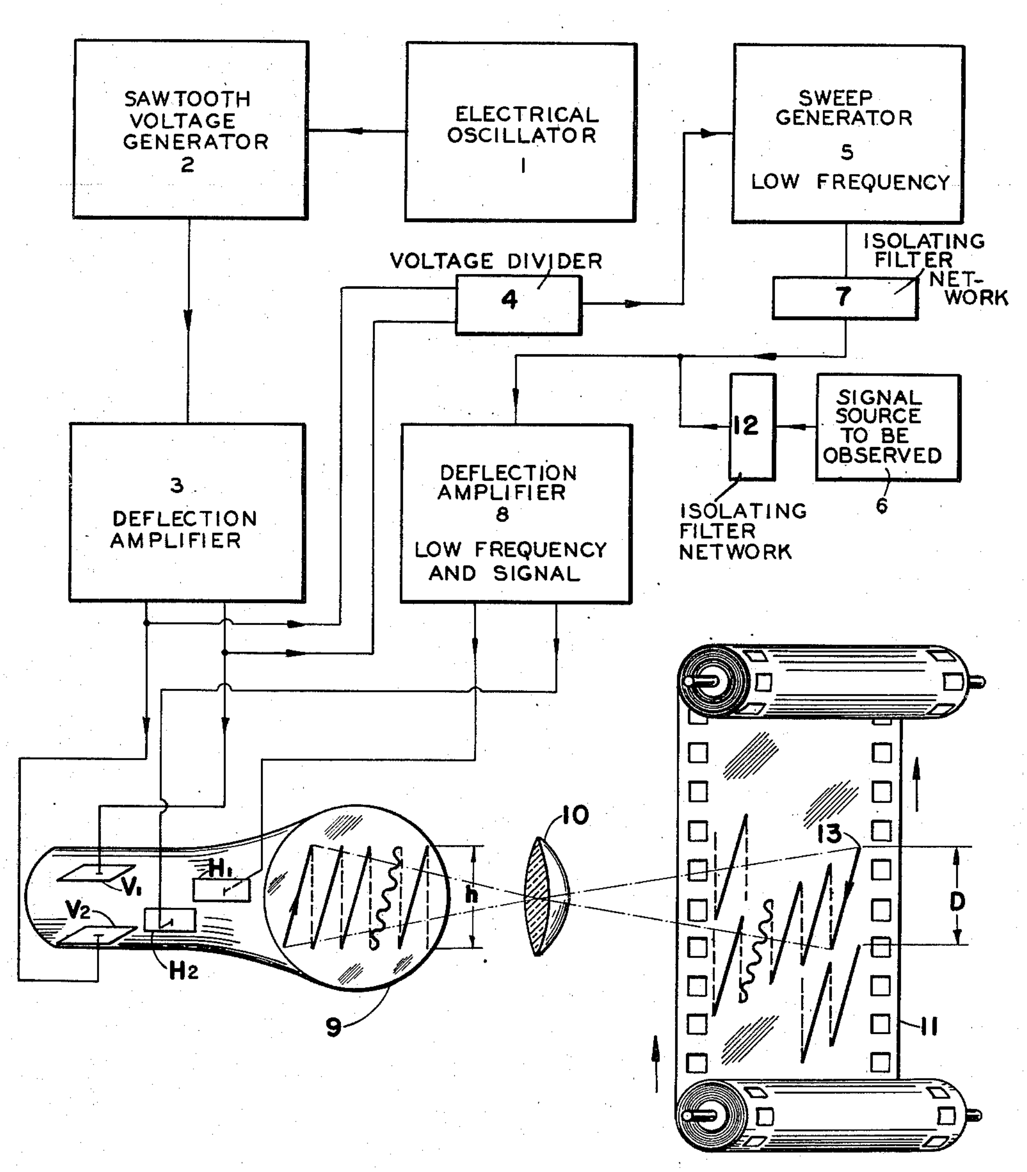
INVENTORS
ROBERT J. URICK
ROBERT M. SHERWOOD
By M. A. Hayes
Attorney Patented Jan. 9, 1951 2,537,105

UNITED STATES PATENT OFFICE 2,537,105

OSCILLOSCOPE AND ITS CIRCUIT

Robert J. Urick and Robert M. Sherwood, San Diego, Calif.

Application April 1, 1946, Serial No. 658,722

4 Claims. (Cl. 315—24)

(Granted under the act of March 3, 1883, as amended April 30, 1928; 370 O. G. 757)

Our invention relates to systems for recording electrical phenomena on a photographic film.

It has been the practice in this art to use an oscillograph to record the desired electrical signals, which may be recurring or transient, and then by means of a lens to permanently record this data on a photographic film, which may be either continuously running or of the single exposure type. In the continuously running method, a very accurate film drive is required in order to have a linear time base and to prevent distortion of applied signals. Another disadvantage is the large amount of film needed in order to record the data along a moving time base and to be sure the film is running when the desired transient electrical phenomenon occurs. In the single exposure type film, extremely accurate timing is required in order to expose the film just as the electrical phenomenon occurs. In some cases where the occurrence time is not known, this method would be impossible. A second disadvantage of this method is the short recording time, limited by the period of one horizontal sweep on the oscillograph.

Our invention uses a continuously running film, in which $n$ (approximately 5–15) lengthwise traces are recorded for each trace across the film. This is possible because of the higher frequency of the time-base sweep voltage applied to the oscillograph's deflecting plates. Recording for a long period with a minimum of distortion, and good resolution of wave shape (due to fast sweep) are hereby obtained.

In accordance with our invention, a continuously moving photographic film is used to permanently record for a desired amount of time the electrical data presented on an oscillograph.

Further in accordance with our invention, the vertical time base of the oscillograph is broken up "$n$" number of times while being swept horizontally, so as to use approximately $1/n$ the length of film ordinarily required.

Our invention further resides in systems having features hereinafter described and claimed.

For an understanding of our invention and for illustration of examples thereof, reference is made to the accompanying drawing, in which the figure is a block diagram of the electrical system, showing the oscillograph and photographic equipment.

In the figure, the electrical oscillator 1 (at $f$ cycles per second) of high frequency reliability and stability supplies a voltage used to synchronize the entire system and to provide an accurate basis for time measurement. It triggers a sawtooth voltage generator 2 of $f$ frequency, which drives a deflection amplifier, whose output is applied to the vertical plates V1, V2 of the cathode ray oscilloscope 9. Tapped to this output of the amplifier 3 is a voltage divider 4 used to synchronize a sawtooth voltage generator of $1/n \times f$ cycles per second, where $n$ is an integer in the order of 5–15.

The output of the "low" frequency saw-tooth generator is applied through an isolating filter network 7, and deflection amplifier 8 to the horizontal plates H1, H2. The source of the signal to be observed 6, which may be a single random voltage or a mixed output of several such voltages, is applied through an isolating filter network 12 and deflection amplifier 8 to the horizontal plates of the oscilloscope 9.

The nature of the pattern formed on the face of the oscillograph 9 by the outputs of amplifiers 3 and 8 is shown. The spot starts at the lower left and moves upward at a rate controlled by the frequency of generator 2 and at the same time moves slowly to the right at a rate controlled by the frequency of generator 5. As it moves right at frequency $1/n \times f$, it also moves up and down at frequency $f$. Any signal 13 coming in appears as a horizontal deflection. The decay rate of the phosphorescence of the tube 9 is high so as to avoid blurring of the photographic record. Since the fly-back time of sweep generators 2, 5 is extremely small, the pattern on the tube provides a virtually continuous record of the incoming signal voltage 6.

The photographic lens 10 is of large aperture, suitable for work with narrow film 11, such as 35 or 16 mm. movie film. The oscillograph 9 and film 11 are at conjugate foci with a linear magnification of M times. (M is less than unity.)

A section of film 11 is carried past lens 10 at a constant though not necessarily accurately known speed. As the film moves upward the latent image of successive vertical lines of the original pattern becomes regularly displaced downward.

The film movement and operating sawtooth frequencies are adjusted so that the film movement D in $n/f$ seconds (period of generator 5 sweep) is slightly more than the length of the oscilloscope screen trace $h$ times the magnification M. In this way a continuous record of the signal 6 is obtained with the expenditure of only slightly more than $1/n$ of the film which would otherwise be required to secure equal detail.

When elapsed time to the occurrence of a signal is important, it can be obtained by counting $n/f$ seconds for each horizontal sweep up to the sweep in which the signal occurs, then counting $1/f$ seconds for each vertical sweep and proportionally for a fraction of a vertical sweep in this horizontal sweep.

The smaller time intervals in which a short duration phenomenon occurs can be accurately measured because each vertical sweep represents $1/f$ seconds. Thus an accurate time base is available for measuring voltage or current differentials with respect to time.

For a clearer understanding of our invention, numerical examples of our improvements are given.

1. For a given frequency response or ability to study transients of very short time occurrence, our invention needs only 300 or less feet of film to cover a 10 minute observation and without interruption or breaks, whereas a conventional system would require approximately 3000 feet of film.

In any measuring system, assume that transients occur in one millisecond and observations must cover 10 minutes, and .06″ of film is minimum length which can be studied to see what occurs in any given one millisecond interval.

In known systems where $V_f$=velocity of film, D=distance film travelled, and T=time of film to travel D:

$$V_f=\frac{D}{T}=\frac{.06''}{.001}=60 \text{ inches/sec.}=5 \text{ feet/sec.}$$

For 10 minutes, this known system would need $D_1$ feet of film, where $$D_1=V_fT_1=5 \text{ ft./sec.}\times 10 \text{ minutes}\times 60=3000 \text{ feet}$$

In our invention, assume $f_v$ (vertical sweep frequency) = 15 cycles, length of screen = 4 inches. and $n$ (number of vertical sweeps on one horizontal sweep) = 12. Then, where $T_h$=period of one horizontal sweep, $f_h$=horizontal frequency:

$$T_h=\frac{1}{f_h}=\frac{1}{15/12}\left(\text{since } f_h=\frac{1}{n}\times f_v\right)=\frac{12}{15}=0.8 \text{ second}$$

The film must travel $$V_{f'}=\frac{\text{length of screen}+0.5'' \text{ clearance}}{\text{time for one horizontal sweep}}=\frac{4.5 \text{ inches}}{0.8 \text{ second}}=5.6 \text{ in./sec.}$$

For ten minute observation, film travel would be $$D_{11}=\frac{5.6 \text{ in./sec.}\times 10\times 60}{12}=280 \text{ feet}$$

Factors such as optical magnification affect both systems equally, and so are omitted.

2. If film speeds comparable to those required in conventional systems are used in our invention, transients of much shorter duration (for example, 1/11 of a millisecond as compared to 1 millisecond) can be studied just as accurately as the conventional system studied transients of 1 millisecond duration. For example:

In known systems, $V_f$=60 inches/sec.

In our invention $$V_f=\frac{4.5 \text{ (length of scope}+0.5'')}{T_h \text{ (period of horizontal scope}}$$

$$V_f=4.5\times f_h=\frac{4.5}{12}f_v \text{ (frequency of vertical sweep generator)}$$

$$f_v=\frac{V_f12}{4.5}=\frac{60}{4.5} \text{ inches/sec.}\times 12=160 \text{ cycles/second}$$

$$T_v=\frac{1}{f_v}=6.25 \text{ milliseconds}$$

$V_v$ (vertical sweep velocity) =

$$\frac{4''}{.00625}\text{ (actual length of scope)}=\frac{.64}{.001}\frac{\text{inch}}{\text{sec.}}$$

$$V_v=\frac{.64}{.001}=\frac{.06''}{x}\ \begin{matrix}\text{(minimum amount of space required for accurate study)}\\ \text{(time interval while time base moves .06'' in our invention)}\end{matrix}$$

$$x=.094 \text{ millisecond}$$

$$\frac{1.000 \text{ millisecond}}{.094 \text{ millisecond}}=\frac{10.6}{1} \text{ or approximately } 11:1$$

(The magnification factor M is omitted, since it acts both in known systems and in my invention.)

3. As the vertical velocity is much greater than the film's velocity, the time base on which any signal is measured is essentially that timing determined by the vertical sweep voltage. The film moves an insignificant distance during each vertical sweep; so its velocity (and degree of accuracy thereof) is not important in the measurement of time. This permits use of simple film drives whose speed regulation is not critical. This affects savings in weight and power.

The invention described herein may be manufactured and used by or for the Government of the United States of America for governmental purposes without the payment of any royalties thereon or therefor.

What is claimed is:

1. In a system for photographically recording on a continuously moving film, oscillograph traces resulting from electrical signals; a synchronizing voltage generator of $f$ frequency, a cathode ray oscilloscope, a sawtooth voltage generator activated by said synchronizing generator, the sawtooth voltage being applied to the vertical plates of said oscilloscope, a sweep generator of $f/n$ frequency applied to the horizontal plates of said oscilloscope, the potentials on the vertical and horizontal plates causing $n$ oblique traces to be produced for each horizontal sweep, a first deflection amplifier being interposed between the sawtooth voltage generator and the vertical plates of said oscilloscope, a second deflection amplifier being interposed between the sweep generator and the horizontal plates of said oscilloscope, said sweep generator being initiated by a portion of the output of the above-mentioned first deflection amplifier, a source of signal to be observed, signals from said source being injected into the input of said second deflection amplifier along with the output of the sweep generator.

2. In a system for photographically recording on a continuously moving film, oscillograph traces resulting from electrical signals; a synchronizing voltage generator of $f$ frequency, a cathode ray oscilloscope, a sawtooth voltage generator activated by said synchronizing generator, a first deflection amplifier in series relationship with said sawtooth generator and connected to the vertical plates of said oscilloscope, a sweep generator of $f/n$ frequency connected to the first deflection amplifier and initiated by a portion of the output of said first deflection amplifier, a second deflection amplifier in series relationship with said sweep generator and connected to the horizontal plates of said oscilloscope so that $n$ oblique traces are produced for each horizontal sweep, a source of signal to be observed, said signal being inserted at the input of said second deflection amplifier to produce horizontal irregularities along the oblique traces.

3. In a system for photographically recording on a continuously moving film, oscillograph traces resulting from electrical signals; a cathode ray oscilloscope, means for effecting vertical deflections on said oscilloscope at a predetermined frequency, means for effecting horizontal deflections at a frequency integrally related to the vertical deflection frequency to produce a plurality of oblique traces, a source of signal to be observed, said signal being inserted in parallel with the horizontal deflecting frequency to produce irregularities along the oblique traces.

4. In a system for photographically recording on a continuously moving film, oscillograph traces resulting from electrical signals; a cathode ray oscilloscope, sawtooth generator means for effecting vertical deflections on said oscilloscope at a frequency $f$, sweep generator means for effecting horizontal deflections at a frequency $f/n$ to produce $n$ oblique traces for each horizontal sweep, means for superimposing on said horizontal deflecting means a signal to be observed thereby producing irregularities on said oblique traces in conformance with said signal.

ROBERT J. URICK.
ROBERT M. SHERWOOD.

REFERENCES CITED

The following references are of record in the file of this patent:

UNITED STATES PATENTS

| Number | Name | Date |
|---|---|---|
| 650,096 | Rodde | May 22, 1900 |
| 2,178,471 | De Bruin | Oct. 31, 1939 |
| 2,227,135 | Hollman | Dec. 31, 1940 |
| 2,293,135 | Hallmark | Aug. 18, 1942 |
| 2,307,505 | Heinmetz | Jan. 5, 1943 |
| 2,402,168 | Lifschutz | June 18, 1946 |
| 2,405,238 | Seeley | Aug. 6, 1946 |
| 2,444,341 | Easton | June 29, 1948 |
| 2,448,762 | Beste | Sept. 7, 1948 |
| 2,465,355 | Cook | Mar. 29, 1949 |
| 2,489,253 | Andre | Nov. 29, 1949 |
| 2,501,352 | Opsahl | Mar. 21, 1950 |